US011157661B2

(12) United States Patent
Vats et al.

(10) Patent No.: US 11,157,661 B2
(45) Date of Patent: Oct. 26, 2021

(54) PROCESS DEVELOPMENT VISUALIZATION TOOL

(71) Applicant: Applied Materials, Inc., Santa Clara, CA (US)

(72) Inventors: Vinayak Veer Vats, San Ramon, CA (US); Sidharth Bhatia, Santa Clara, CA (US); Garrett Ho-Yee Sin, Sunnyvale, CA (US); Pramod Nambiar, Sunnyvale, CA (US); Hang Yu, San Jose, CA (US); Sanjay Kamath, Fremont, CA (US); Deenesh Padhi, Santa Clara, CA (US); Heng-Cheng Pai, Cupertino, CA (US)

(73) Assignee: Applied Materials, Inc., Santa Clara, CA (US)

( * ) Notice: Subject to any disclaimer, the term of this patent is extended or adjusted under 35 U.S.C. 154(b) by 35 days.

(21) Appl. No.: 16/716,274

(22) Filed: Dec. 16, 2019

(65) Prior Publication Data

US 2020/0202044 A1 Jun. 25, 2020

Related U.S. Application Data

(60) Provisional application No. 62/782,282, filed on Dec. 19, 2018.

(51) Int. Cl.
*G06F 30/12* (2020.01)
*G06F 16/904* (2019.01)
(Continued)

(52) U.S. Cl.
CPC ............ *G06F 30/12* (2020.01); *G06F 16/903* (2019.01); *G06F 16/904* (2019.01); *G06F 2119/18* (2020.01)

(58) Field of Classification Search
CPC ....................................................... G06F 30/12
(Continued)

(56) References Cited

U.S. PATENT DOCUMENTS 6,263,255 B1 7/2001 Tan et al.
7,143,370 B1 11/2006 Erhardt
(Continued)

FOREIGN PATENT DOCUMENTS

KR 20150084932 A 7/2015

OTHER PUBLICATIONS

International Search Report and Written Opinion of International Application No. PCT/US2019/067604 dated Apr. 28, 2020, 13 pages.

*Primary Examiner* — Eric D Lee
(74) *Attorney, Agent, or Firm* — Lowenstein Sandler LLP (57) ABSTRACT

A process development visualization tool generates a first visualization of a parameter associated with a manufacturing process, and provides a GUI control element associated with a process variable of the manufacturing process, wherein the GUI control element has a first setting associated with a first value for the process variable. The process development tool receives a user input to adjust the GUI control element from the first setting to a second setting, determines a second value for the process variable based on the second setting, and determines a second set of values for the parameter that are associated with the second value for the process variable. The process development tool then generates a second visualization of the parameter, wherein the second visualization represents the second set of values for the parameter that are associated with the second value for the process variable.

20 Claims, 7 Drawing Sheets

(51) Int. Cl.
*G06F 16/903* (2019.01)
*G06F 119/18* (2020.01)

(58) Field of Classification Search
USPC .......................................................... 716/51
See application file for complete search history.

(56) References Cited

U.S. PATENT DOCUMENTS

| | | |
|---|---|---|
| 7,199,809 B1 | 4/2007 | Lacy et al. |
| 7,239,737 B2 | 7/2007 | Luque et al. |
| 7,333,871 B2 | 2/2008 | Schwarm |
| 7,570,797 B1 | 8/2009 | Wang et al. |
| 7,738,693 B2 | 6/2010 | Luque |
| 8,229,587 B2 | 7/2012 | Shieh et al. |
| 2004/0119749 A1 | 6/2004 | Luque |
| 2014/0135970 A1 | 5/2014 | Kaushal et al. |
| 2014/0136146 A1 | 5/2014 | McCready |
| 2017/0045573 A1* | 2/2017 | Iskandar ................. G06F 30/00 |
| 2017/0132352 A1 | 5/2017 | Cantwell et al. |

* cited by examiner

PROCESS DEVELOPMENT VISUALIZATION TOOL

RELATED APPLICATIONS

This patent application claims the benefit under 35 U.S.C. § 119(e) of U.S. Provisional Application No. 62/782,282, filed Dec. 19, 2018, which is herein incorporated by reference.

FIELD OF THE DISCLOSURE

Embodiments of the present disclosure relate generally to process development, such as development for semiconductor wafer manufacturing processes, and more particularly to a visualization tool that facilitates process development.

BACKGROUND OF THE DISCLOSURE

The continued demand for electronic devices calls for an increasingly larger demand for semiconductor wafers. As new semiconductor devices are designed and as semiconductor manufacturing equipment evolves, new processes are developed to manufacture the semiconductor devices on semiconductor wafers. Development of a single process recipe generally involves design of experiments (DOEs) to test many different processing variables and their effects on properties of the semiconductor wafers and ultimately on manufactured semiconductor devices. Such DOEs result in the collection of massive amounts of data on process variables and wafer results. Analyzing such large quantities of data is time consuming and difficult.

SUMMARY

The following is a simplified summary of the disclosure in order to provide a basic understanding of some aspects of the disclosure. This summary is not an extensive overview of the disclosure. It is not intended to delineate any scope of the particular implementations of the disclosure or any scope of the claims. Its sole purpose is to present some concepts of the disclosure in a simplified form as a prelude to the more detailed description that is presented later.

In one embodiment, a method includes generating a first visualization of a first parameter associated with a manufacturing process performed on a wafer, wherein values for the first parameter are dependent on a plurality of process variables of the manufacturing process, and wherein the first visualization represents a first set of values for the first parameter that are associated with a first value for a first process variable of the manufacturing process. The method further includes providing a first graphical user interface control element associated with the first process variable of the manufacturing process, wherein the first graphical user interface control element has a first setting associated with the first value for the first process variable. The method further includes receiving a user input to adjust the first graphical user interface control element from the first setting to a second setting. The method further includes determining a second value for the first process variable based on the second setting of the first graphical user interface control element. The method further includes determining a second set of values for the first parameter that are associated with the second value for the first process variable of the manufacturing process. The method further includes generating a second visualization of the first parameter associated with the manufacturing process, wherein the second visualization represents the second set of values for the first parameter that are associated with the second value for the first process variable. In one embodiment, a computer readable medium includes instructions that, when executed by a processing device, cause the processing device to perform the method.

In one embodiment, a system includes a data store to store process development data for a manufacturing process performed on a wafer and further includes a computing device. The computing device includes a memory comprising instructions for a process development visualization tool as well as a processing device operatively connected to the memory. Execution of the instructions for the process development visualization tool causes the processing device to generate a first visualization of a first parameter associated with the manufacturing process, wherein values for the first parameter are dependent on a plurality of process variables of the manufacturing process, and wherein the first visualization represents a first set of values for the first parameter that are associated with a first value for a first process variable of the manufacturing process. The processing device provides a first graphical user interface control element associated with the first process variable of the manufacturing process, wherein the first graphical user interface control element has a first setting associated with the first value for the first process variable. The processing device receives a user input to adjust the first graphical user interface control element from the first setting to a second setting. The processing device determines a second value for the first process variable based on the second setting of the first graphical user interface control element. The processing device generates a query comprising the second value for the first process variable, send the query to the data store. The processing device receives a response to the query, the response comprising a second set of values for the first parameter that are associated with the second value for the first process variable of the manufacturing process. The processing device generates a second visualization of the first parameter associated with the manufacturing process, wherein the second visualization represents the second set of values for the first parameter that are associated with the second value for the first process variable.

BRIEF DESCRIPTION OF THE DRAWINGS

Various embodiments of the present disclosure will be understood more fully from the detailed description given below and from the accompanying drawings of various embodiments of the disclosure.

DETAILED DESCRIPTION

Embodiments of the present disclosure are directed to a visualization tool that arranges and presents DOE result data in a manner that facilitates and speeds up process development for manufacturing processes on wafers, such as manufacturing processes for semiconductor devices. The visualization tool provides an interactive visualization of on-wafer results that may be modified by changes of multiple variables. The visualization tool may provide, for example, a virtual cockpit experience of process development. The visualization tool reduces the space used to view wafer maps and other visualizations of on-wafer data, provides improved visualizations and interactive user control, provides an immersive experience for a user by arranging multiple wafer maps and other visualizations around a user, provides an ability to calculate and portray on-wafer results (e.g., wafer maps) interactively, reduces the amount of time and resources used to analyze data, increases the dimensions of viewing process development data, and increases the speed of data analysis in embodiments.

Process development includes an exhaustive study of the interaction and optimization of process variables of interest to deliver on-wafer results of properties of interest (referred to herein as parameters). To develop a manufacturing process for a wafer, multiple DOEs are performed to generate very large (i.e., massive) amounts of data. The data includes many different parameters, including on-wafer results of measured properties, physical sensor measurements, and/or virtual sensor measurements for each process run. On-wafer results may include metrology measurements at many different points on a wafer. Additionally, many different sensors may generate data for a process run of a process under development. To run a successful DOE, many different process runs are performed, with each process run including multiple wafers, and each wafer having multiple points at which measurements are taken. Moreover, there may be tens or hundreds of different variables to consider for a manufacturing process, and these variables may be adjusted to result in many process runs that use different combinations of process variables. The many possible variables that may be adjusted and the many different parameters that may be recorded for each combination of variable values results in a combinatorial explosion. Combinatorial explosion describes the effect of functions that grow rapidly (e.g., exponentially) as a result of combinatorial considerations. Combinatorial explosion can pose a problem in computing, as there may be insufficient resources (e.g., insufficient memory, processing power, time, etc.) to test every possible unique combination of variable values and determine an optimal combination of variable values based on the testing. Embodiments provide a visualization tool that arranges and graphically presents wafer data in a manner that enables users to easily analyze such data, adjust variables, and design an optimal process using DOE results for the process, while avoiding the complications associated with combinatorial explosion.

The visualization tool in embodiments generates one or more visualizations or overlays of data, where each visualization shows DOE results for a particular parameter (e.g., a particular on-wafer parameter that has been measured and/or a particular sensor reading). The visualization tool further provides a set of graphical user interface (GUI) control elements, where each GUI control element is associated with a particular process variable or combination of process variables. Each GUI control element may be adjusted based on a user interaction with the GUI control element (e.g., such as by a user clicking and dragging a slider, clicking on an arrow of the process control element, rotating a process control element, and so on). Each setting of a process control element may be associated with a different value for a particular process variable (or combination of values for multiple process variables). Accordingly, by adjusting a process control element, a user updates a setting of the process control element to select a different value of that process control element's associated process variable.

Some or all of the visualizations of process parameters may then be automatically adjusted to show on-wafer results of that process parameter that are associated with the updated setting of the GUI control element. Accordingly, multiple visualizations of on-wafer results can be changed through a simple user interaction with a GUI control element. These visualizations may be arranged as per user preference on a single screen or across multiple screens around a user in the manner of a virtual cockpit to enhance the experience and speed of process development.

In an example, changes in process variables may be visualized as a sequence of images of process parameters (e.g., on-wafer results) that are controlled by modulating a variable of interest via user interaction with a slider or other GUI control element. An overlay of multiple wafer maps stacked on top of each other may be generated, for example, with a single one of the wafer maps being shown at a time in accordance with a current setting of a GUI control element. The on-data results may be presented in a similar manner to a movie, except that rather than each frame of a movie being associated with a different time stamp, each wafer map is associated with a different process variable value for a variable of interest. Wafer maps overlaid on top of each other will have been measured for the same property for the same recipe. However, each wafer map will differ as a result a change in the value of the variable of interest. Any arbitrarily large number of variables of interest may be associated with GUI control elements and any arbitrarily large number of parameters of interest may be associated with visualizations.

Figure 1:
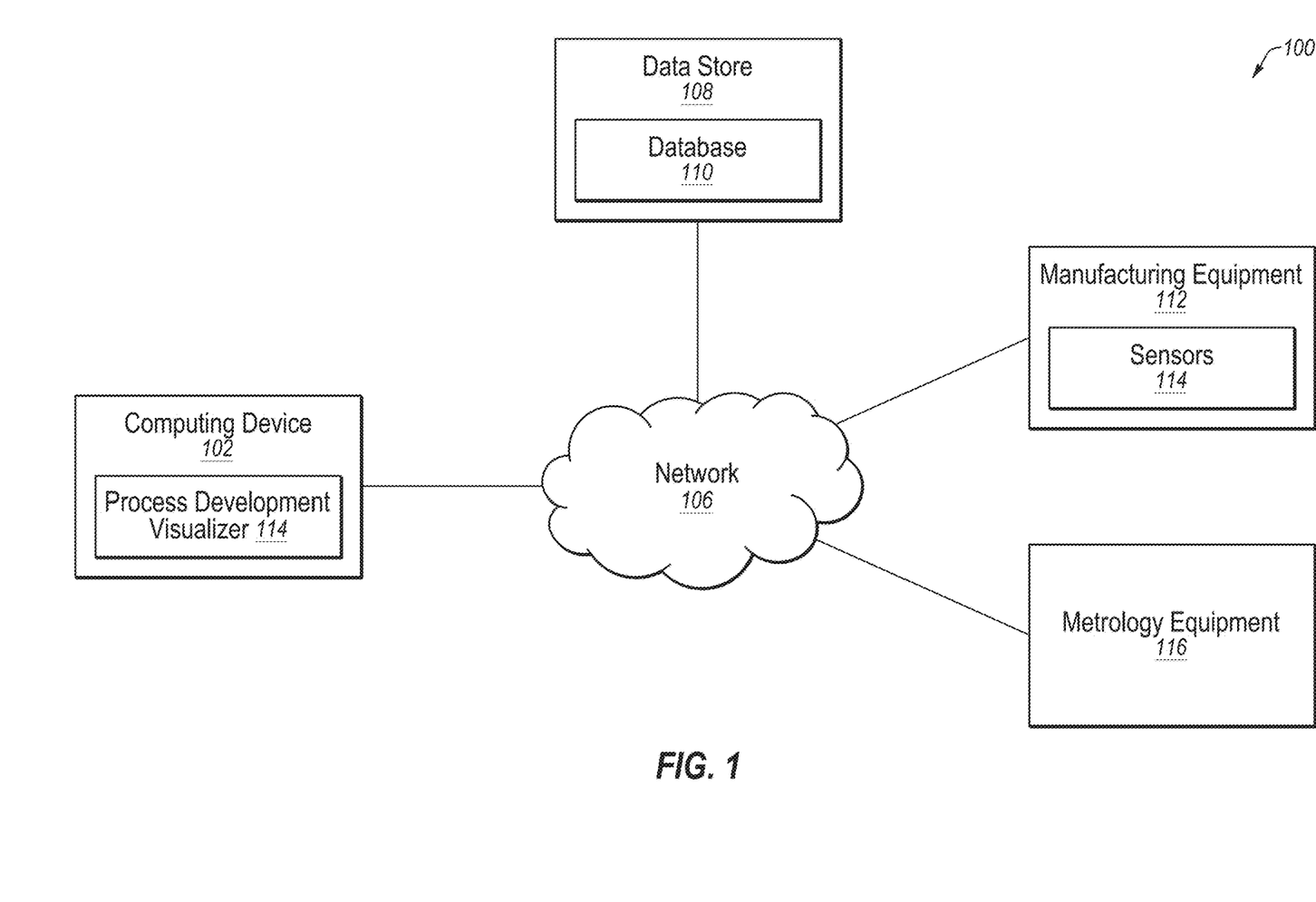
FIG. 1 illustrates an example architecture of a system that includes a process development visualizer, in accordance with embodiments of the present disclosure.

FIG. 1 illustrates an example architecture of a system 100 that includes a process development visualizer 104, in accordance with embodiments of the present disclosure. In one embodiment, the system 100 may include a computing device 102, data store 108, manufacturing equipment 112 and metrology equipment 116.

The manufacturing equipment 112 may be semiconductor wafer manufacturing equipment that includes one or more processing chambers. For example, the manufacturing equipment 112 may be any one of an ion implanter, an etch reactor (e.g., a processing chamber), a photolithography device, a deposition device (e.g., for performing chemical vapor deposition (CVD), physical vapor deposition (PVD), ion-assisted deposition (IAD), and so on), or any other manufacturing device that processes wafers.

In one embodiment, the manufacturing equipment 112 is connected to data store 108 via network 106. The network 106 may be a local area network (LAN), and may be part of an equipment automation layer that may additionally include routers, gateways, servers, data stores, and so on. The manufacturing equipment 112 may connect to the equipment automation layer (e.g., to the network 106) via a SEMI Equipment Communications Standard/Generic Equipment Model (SECS/GEM) interface, via an Ethernet interface, and/or via other interfaces. In one embodiment, the equipment automation layer enables process data (e.g., data collected by manufacturing equipment 112 during a process run) to be stored in data store 108. In other embodiments, manufacturing equipment 112 may connect directly to data store 108.

Manufacturing equipment 112 may include many sensors 114, which may monitor different properties or parameters (e.g., process conditions) during a process run. Examples of sensors 114 include temperature sensors, pressure sensors, current sensors, voltage sensors, humidity sensors, and so on. All of these measured parameter values may be sent to data store 108 along with information on the particular process run, such as when the process run was performed, a recipe of the process run (e.g., including different process variable values at different stages of the process run), and so on.

A process under development may be an etch process, deposition process, implant process, wet clean process, dry clean process, lithography process, electro fill process, plasma treatment process, annealing process, chemical mechanical planarization (CMP) process, or other process. Often a coating will be present on the wafer after the process. The coating may be a single layer coating or a multiple layer coating. The wafer may have been processed by a single tool or by multiple tools carrying out a variety of operations.

Once a process run is complete, processed wafers may be removed from the manufacturing equipment 112 and measured by metrology equipment 116. The metrology equipment 116 may include, for example a scanning electron microscope (SEM) that may measure critical dimensions (e.g., line width), an ellipsometer that may measure coating thickness, an overlay metrology system that may measure on-product overlay error, an implant dose metrology tool, a sheet resistance measurement system, and so on. Examples of on-wafer parameters that may be measured include coating thickness, refractive index, sheet resistance, resistivity, conductivity, grain size, roughness, stress across the wafer, coating composition, reflectance, absorbance, angle of observation, angle of incidence, angle of reflection, angle of diffraction, density, etch rate, and step coverage, to name a few. Wafers may be processed by multiple different metrology equipment 116 to generate different on-wafer parameter measurements. Metrology equipment 116 may connect to data store 108 via network 106. The metrology equipment 116 may connect to the equipment automation layer (e.g., to the network 106) via the SECS/GEM interface, via an Ethernet interface, and/or via other interfaces.

Data store 108 may be a computing device that includes a one or more storage devices such as disk drives and/or solid state storage devices (SSDs). Data store 108 may include a database 110 optimized for storage of process development data. The database 110 may store data for process runs, where the data may include recipe information for the process run as well as data identifying manufacturing equipment 112 that performed the process run, a chamber of the manufacturing equipment 112 that performed the process run, a wafer identification of a processed wafer, information on a location of the wafer in the manufacturing equipment, a time stamp, all sensor data collected by the sensors 114, measurements generated by metrology equipment 116, and/or other data. For example, there may be separate columns in the database for each wafer location, for each parameter, for each combination of wafer location and parameter, for each process variable, and so on.

Computing device 102 may connect to the data store 108 via network 106 or directly. In one embodiment, data store 108 is a component of computing device 102. Computing device 102 may include a processing device, memory, storage device, and so on. Computing device 102 may correspond to computer system 600 of FIG. 6 in embodiments. Computing device 102 includes a process development visualizer 104.

Process development visualizer 104 arranges and presents data associated with DOEs of manufacturing processes in a manner that is easy for a user to view and manipulate, and in a manner that speeds up process development. Process development visualizer 104 may retrieve data on process variables and process parameters (e.g., on-wafer results), and present such data via visualizations (e.g., overlays) of one or more process parameters. Process development visualizer 104 may provide multiple GUI control elements that are each associated with one or more process variable of a manufacturing process under development. Users may interact with the GUI control elements to adjust settings of those GUI control elements. Based on a change to a setting of a GUI control element, process development visualizer 104 may generate a database query that includes a process variable value associated with the new setting of the GUI control element as well as process variable values associated with other GUI control elements. Process development visualizer 104 may then send the database query to database 110, which may process the query, generate a result, and send the result back to computing device 102 for process development visualizer 104 to process. Process development visualizer 104 may generate new visualizations of process parameters based on the data (e.g., parameter values) in the response to the database query.

Alternatively, process development visualizer may retrieve some or all applicable data for a process under development from database 110 before displaying any visualizations, and may compute the visualizations associated with each combination of proves variable values for key process variables based on such data. The key process variables may be variables that are selected by a user as being key variables. For example, a user may select 5, 10 or more process variables to optimize. Thus, the visualizations for the various combinations of process variable values may be computed before a user begins adjusting settings of GUI control elements or may be generated on-the-fly in response to user interaction with GUI control elements.

Figure 2A:
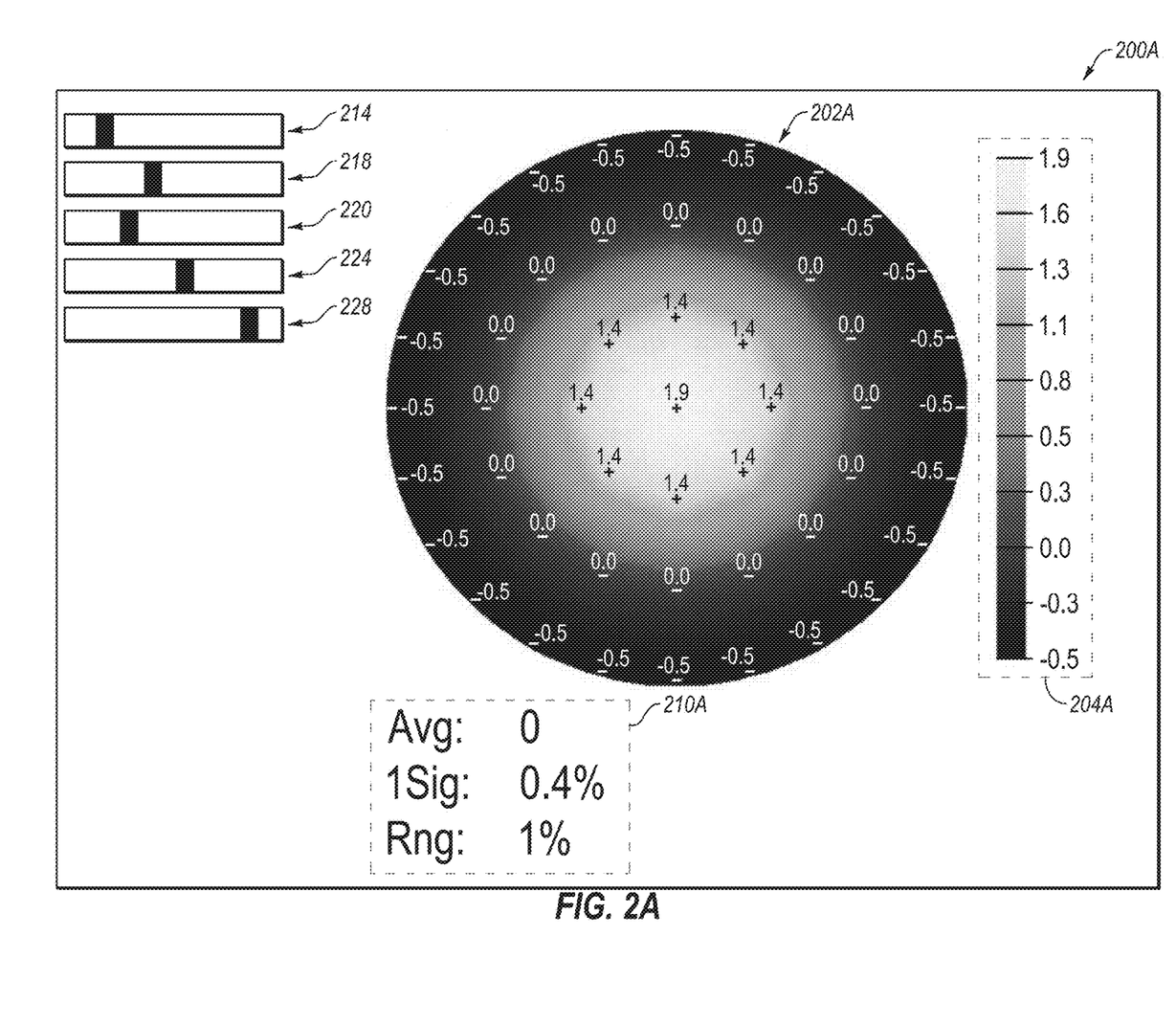
FIG. 2A illustrates a first view of a process development visualizer, the first view including a first example visualization of a parameter associated with a manufacturing process on a wafer and a set of graphical user interface (GUI) control elements, in accordance with an embodiment of the present disclosure.
Figure 2B:
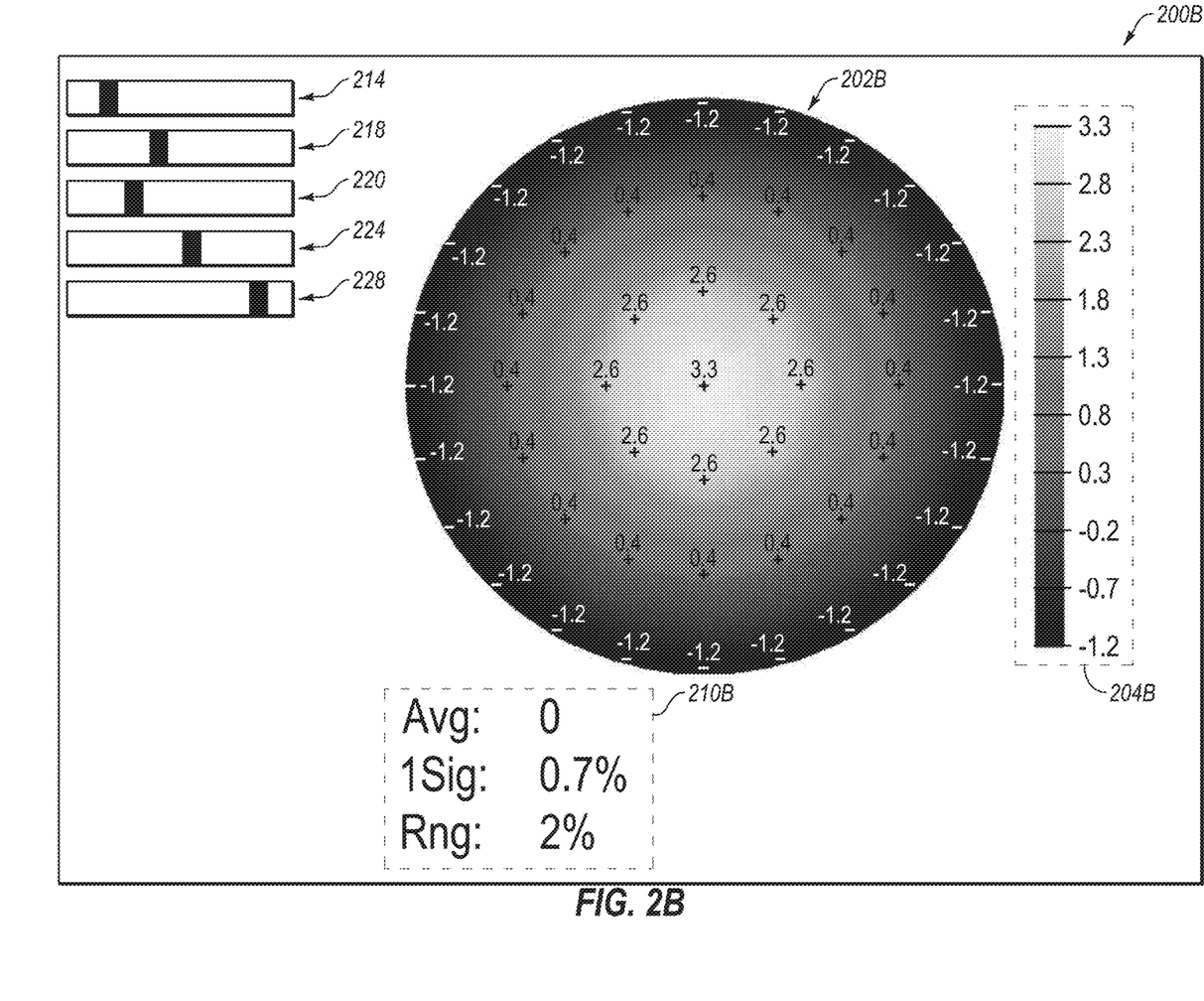
FIG. 2B illustrates a second view of the process development visualizer, the second view including a second example visualization of the parameter of FIG. 2A after adjustment of one of the GUI control elements, in accordance with an embodiment of the present disclosure.

In embodiments, process development visualizer 104 generates and displays view that include visualizations and GUI control elements as shown in FIGS. 2A-2B. In embodiments, process development visualizer 104 performs the methods of FIGS. 3-4.

FIG. 2A illustrates a first view 200A of a process development visualizer, the first view 200A including a first example visualization 202A of a parameter associated with a manufacturing process on a wafer and a set of graphical user interface (GUI) control elements 214, 218, 220, 224, 228 in accordance with an embodiment of the present disclosure. The first example visualization 202A is a wafer map that has different shades, fills and/or colors that are each associated with different values of a particular parameter. The particular parameter may be, for example, a sensor reading of a physical sensor, a sensor reading of a virtual sensor, or a metrology measurement.

Virtual sensors may be based on real sensors and/or real metrology measurements. Functions may be generated for virtual sensors, where the value of a virtual sensor is based on the values of one or more real sensors and/or real metrology measurements. For example, a virtual sensor may be generated that is based on temperature and pressure. A function for the virtual sensor may be generated such as a parametric function that includes variables for the temperature and pressure.

Examples of metrology measurements that may be depicted in the first example visualization 202A are coating thickness, refractive index, sheet resistance, resistivity, conductivity, grain size, roughness, stress across the wafer, coating composition, reflectance, absorbance, angle of observation, angle of incidence, angle of reflection, angle of diffraction, density, etch rate, and step coverage. As shown in the wafer map, the values of the particular parameter are determined at multiple different points on a wafer (e.g., 49 points to 600 points in some embodiments). A key 204A may show the parameter measurement values that are represented by different colors, shades, fills, etc.

The first example visualization 202A is based on values of a particular parameter that were measured from a wafer that was processed using a process having particular process variable values. These process variable values are represented in GUI control elements 214, 218, 220, 224, 228. Each of these GUI control elements 214-228 is associated with a particular process variable or combination of process variables. Examples of process variables that may be associated with a GUI control element include temperatures, pressures, dimensions, flow rates, material compositions, timings, equipment parts at various locations in process chambers used to process the wafer, and so on. Other examples of process variables include operators, process recipes, algorithms, sequences with other tools (e.g., what tool was the wafer processed on in a prior process), vendors, wafer substrates, location, tools, chambers, sequences with other variables, sequences with other recipes (e.g., what other recipes were run to manufacture the wafer and/or what other recipes were run on the equipment used to perform the process under development on the wafer), and so on. Any arbitrarily large number of variables of interest may be associated with GUI control elements.

Each of the GUI control elements 214-228 has a setting that corresponds to a process variable value used during a manufacturing process under development to generate on-wafer data reflected in the first example visualization 202A. Any of the GUI control elements 214-228 may be adjusted to change the setting of the GUI control element, which corresponds to a change in a value of a process variable associated with that GUI control element.

The GUI control elements 214-228 may be any type of GUI control elements, including wheels, sliders, dials, bars, and so on. For example, GUI control elements 214-228 are sliders. A user may use a touch screen interface or mouse interface to tap on and drag any of the sliders to a target position. This may cause a different visualization to be determined and displayed. As the variable of interest is changed via interaction with an appropriate GUI control element 214-228, different windows or screens showing different wafer maps each showing its own property of interest may be changed. This will generate a visual impact of seeing multiple on-wafer properties or parameters change by the change of the variable of interest.

In the example view 200A, only a single visualization 202A is shown. However, multiple different visualizations may be displayed, with each visualization displaying a different parameter or property of a wafer. For example, a first wafer map may show temperature, a second wafer map may show coating thickness, a third wafer map may show coating composition, and a fourth wafer map may show coating hardness. An adjustment of a GUI control element associated with a process variable may cause all of the visualizations to change.

In some embodiments, the view 200A further includes one or more computed statistics on the parameter of interest. For example, the averages (avg), standard deviation (e.g., 1-sigma or one standard deviation value), range (mg), minimum, maximum, etc. may be computed for the measured values of the parameter of interest that is shown in the visualization 202A.

FIG. 2B illustrates a second view 200B of the process development visualizer, the second view 200B including a second example visualization 202B of the parameter of FIG. 2A after adjustment of one of the GUI control elements 214, in accordance with an embodiment of the present disclosure. As shown in the visualization 202B, adjustment of the setting for the GUI control element 214 has resulted in different values for the parameter of interest. Other GUI control elements 218-228 may also be adjusted to cause further changes to the values of the parameter shown in the visualization 202B.

The first example visualization 202A and second example visualization 202B are different wafer maps showing parameter values at various locations on a wafer based on a particular set of process variable values. However, it should be understood that embodiments described herein are not limited to wafer map visualizations. Other one-dimensional, two-dimensional and/or three-dimensional visualizations may also be generated and shown in addition to, or instead of, wafer maps. For example, visualizations may include line graphs (e.g., showing wafer curvature across a wafer).

In some embodiments, the process development visualizer may provide a GUI control element that can be selected to split a visualization of a parameter into two separate visualizations for that parameter. Each of the visualizations for the parameter may display different parameter values and be based on different process variable values. This may enable a user to compare the parameter results for a parameter based on different process variable value combinations side by side.

Figure 3:
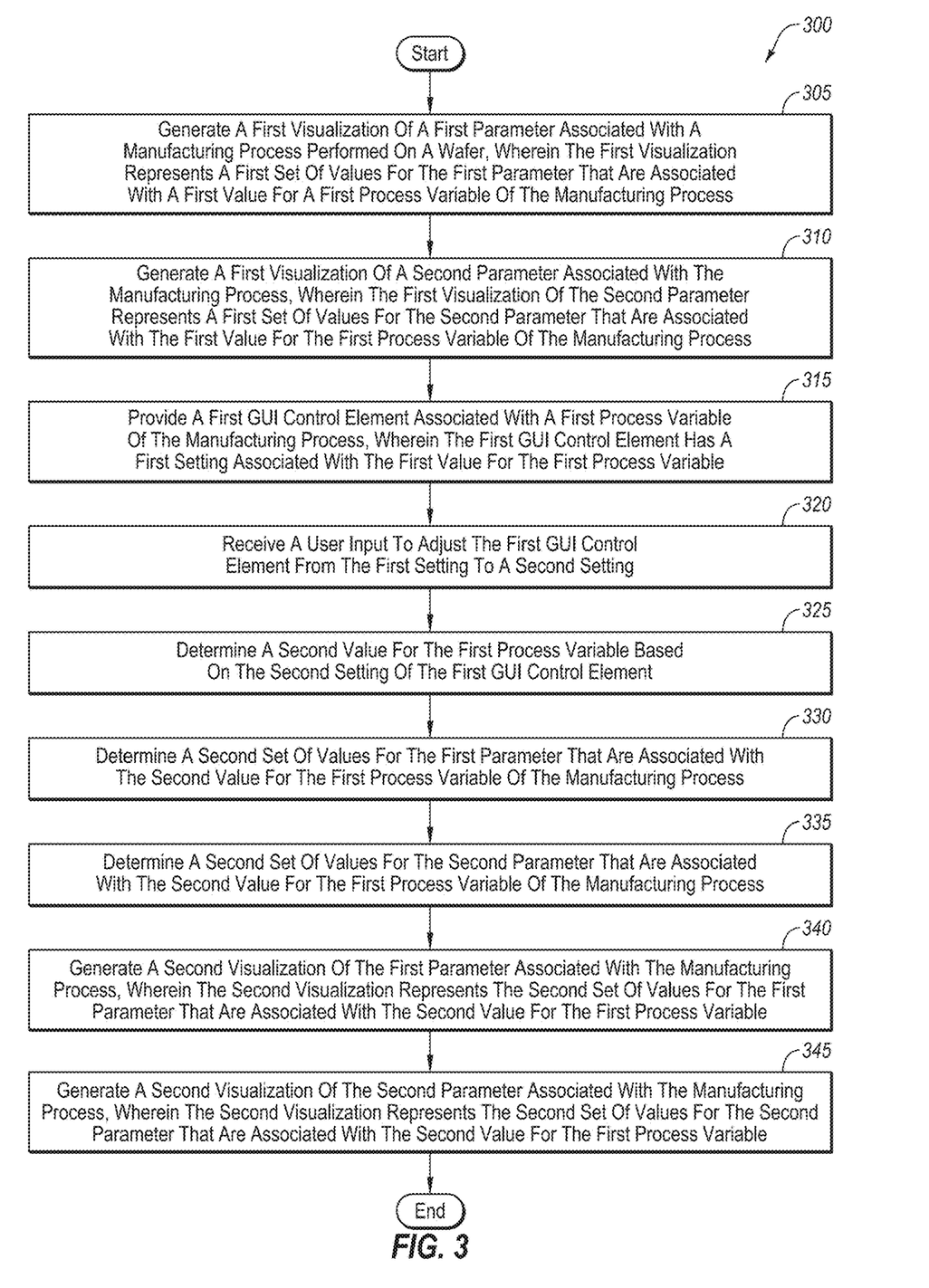
FIG. 3 is a flow diagram illustrating a method for visualizing design of experiments (DOE) results for a manufacturing process on a wafer, in accordance with an embodiment of the present disclosure.

FIG. 3 is a flow diagram illustrating a method 300 for visualizing design of experiments (DOE) results for a manufacturing process on a wafer, in accordance with an embodiment of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic comprises process development visualizer 104 of FIG. 1.

Method 300 may be performed by processing logic responsive to a user loading process development visualizer 104. The process development visualizer may include a GUI that a user may interact with to perform one or more operations related to process development. The user may select a process under development to load based a process ID, which may identify the process and/or a version of the process. The user may additionally select one or more process parameters to be displayed as well as one or more process variables to associate with GUI control elements. The process variables that have a largest impact on a process may change from process to process, and the process parameters (e.g., on-wafer results) that have a largest impact on device performance may change from process to process. The process development visualizer 104 may include default recommendations for process parameters to display in visualizations and/or for process variables to associate with GUI control elements for a particular process under development. The default recommendations may be based on a category or class of the process under development, based on prior user selections of other developed processes, and/or based on other information.

Once process variables are selected and an on-wafer parameter is selected, data for the process under development may be retrieved from a database. The data may be retrieved by generating a database query and sending the database query to a database (e.g., to a computing device or data store comprising a database). The database query may include a specific set of process variable values in an embodiment. In another embodiment, the database query may include ranges of process variable values for one or more process variables. In another embodiment, the database query may indicate all process variable values for one or more process variables. The database query may additionally include identifications of one or more parameters for which values are requested. The database may then generate a response that includes parameter values (e.g., for on-wafer parameters) for each of the parameters identified in the database query. The response may include parameter values for multiple different points or locations on a wafer for each of the one or more parameters. For example, the response may include 49 different parameter values of a particular parameter, where each parameter value is associated with a particular location on a wafer.

Processing logic may generate a first visualization of a first parameter (e.g., a first parameter identified in the query) at block 305. The first visualization may be displayed on a screen and/or window. Alternatively, or additionally, the first visualization may be displayed in a virtual reality or augmented reality heads up display. A user may position windows as desired, where each window may be associated with a different parameter. The first visualization may include parameter values for the first parameter that are based on a particular set of process variable values. Accordingly, the first visualization represents a first set of values for the first parameter that are associated with a first value for a first process variable (as well as first values for one or more other process variables).

GUI control elements may be associated with some or all of the process variables. Each of the GUI control elements may include a setting associated with a particular process variable value that was used in the process to produce the parameter values shown in the first visualization.

In some embodiments, visualizations for multiple different parameters are shown concurrently in different windows and/or on different screens. Accordingly, at block 310 processing logic may generate a second visualization of a second parameter (e.g., a second parameter identified in the query) at block 310. The second visualization may be displayed on a screen and/or window. The second visualization may include parameter values for the second parameter that are based on the same particular set of process variable values that are associated with the parameter values displayed in the first visualization. Accordingly, the second visualization represents a first set of values for the second parameter that are associated with the first value for the first process variable (as well as the first values for the one or more other process variables).

As mentioned, the database query may have been a query for parameter values associated with a single set of process variable values. Alternatively, the query may have been a query for parameter values associated with multiple different sets of process variable values. If the query included a request for parameter values associated with multiple different sets of process variable values, then processing logic may generate additional visualizations for each of the parameters associated with visualizations. Each generated visualization for a parameter may be associated with a different set of process variable values, and may include different sets of parameter values. However, only a single visualization for a parameter may be shown in a view or window at a time in some embodiments. The other visualizations may be pre-generated, but may not be shown until a user selects a particular set of process variable values associated with those other visualizations. Such user selection may be made via the GUI control elements associated with the appropriate process variables.

At block 315, processing logic provides a first GUI control element associated with a process variable of the manufacturing process. The first GUI control element has a first setting associated with the first value of the first process variable. The first GUI control element having the first setting is displayed in a view or window. Processing logic may additionally provide and display one or more additional GUI control elements, where each GUI control element may be associated with a different process variable. Each GUI control element may have a setting associated with a particular process variable value that was used to cause the parameter values shown in the first visualization.

At block 320, processing logic receives a user input to adjust the first GUI control element from a first setting to a second setting. For example, a user may use a touch screen or mouse to click on and/or otherwise select the first GUI control element and to modify the first GUI control element. For example, a user may click and drag on a slider to adjust a position of the slider. In another example, a user may click on and rotate a dial or wheel to adjust a rotation angle of the dial or wheel. In another example, a user may click on a text interface box for a GUI control element and then type in a process variable value.

At block 325, processing logic determines a second value for the first process variable based on the second setting. Each setting of the first GUI control element may be associated with a different process variable value. The relationship between process variable values and settings of the GUI control element may be automatically determined based on a number of different process variable values for a process variable, a scale or range of the process variable values, a size of the GUI control element, and/or a number of different settings of the GUI control element.

At block 330, processing logic determines a second set of values for the first parameter that are associated with the second value for the first process variable of the manufacturing process (and that are associated with the first values for the one or more additional process variables). At block 335, processing logic may also determine a second set of values for the second parameter that are associated with the second value for the first process variable of the manufacturing process (and that are associated with the first values for the one or more additional process variables). The second set of values for the first parameter and/or the second set of values for the second parameter may be determined by generating a database query that includes the second value for the first process variable (and the first values for the one or more additional process variables), and sending the database query to the database. The database query may additionally identify the first parameter and optionally the second parameter. A response to the query may then be received, which may include the second set of values for the first parameter and optionally the second set of values for the second parameter. Alternatively, the second set of values for the first parameter and/or the second set of values for the second parameter may have already been received by the processing logic (e.g., prior to or during the operations of block 305).

In some instances there may not be test data for a particular combination of process variable values. For example, a DOE may have generated data for a coating thickness with a process time of 3 minutes, a process time of 5 minutes, and a process time of 8 minutes. However, a user may adjust a GUI control element to a setting associated with 4 minutes or 10 minutes, for example. In such instances, processing logic may interpolate or extrapolate parameter values for the new process variable value for which data was not generated. The interpolation or extrapolation may be performed, for example, by performing linear regression on at hand data.

At block 340, processing logic may generate a second visualization of the first parameter associated with the manufacturing process. The second visualization of the first parameter represents the second set of values for the first parameter that are associated with the second value for the first process variable (and with the first values for the one or more additional process variables). The second visualization of the first parameter may be displayed, and may replace the display of the first visualization of the first parameter.

At block 345, processing logic may generate a second visualization of the second parameter associated with the manufacturing process. The second visualization of the second parameter represents the second set of values for the second parameter that are associated with the second value for the first process variable (and with the first values for the one or more additional process variables). The second visualization of the second parameter may be displayed, and may replace the display of the first visualization of the second parameter.

In one embodiment, processing logic determines whether the second visualization of the first parameter and/or the second visualization of the second parameter ware based on interpolated or extrapolated data. If a determination is made that a visualization is based on interpolated or extrapolated data, then a graphical indicator may be output to indicate to the user that the shown on-wafer data is not measured data, but is instead interpolated or extrapolated data.

In some embodiments, the second visualizations of the first and/or second parameter may have been pre-generated prior to or during the operations of block 305. In such embodiments, the second visualizations may be displayed at blocks 340 and 345 without having to regenerate the second visualizations.

In some embodiments, processing logic may present a GUI control element that enables a user to export data associated with a current visualization or set of current visualizations. Responsive to user interaction with such a GUI control element, processing logic may generate one or more files. For example, processing logic may generate a separate file for each visualization. Generated files may be comma separated value (CSV) files, Excel (xml) files, text files, or other types of files. These files may have a reduced dimensionality as compared to the overlay of visualizations in some embodiments. Users may then open the exported files in other applications or software such as Excel for their own visualization purposes.

Figure 4:
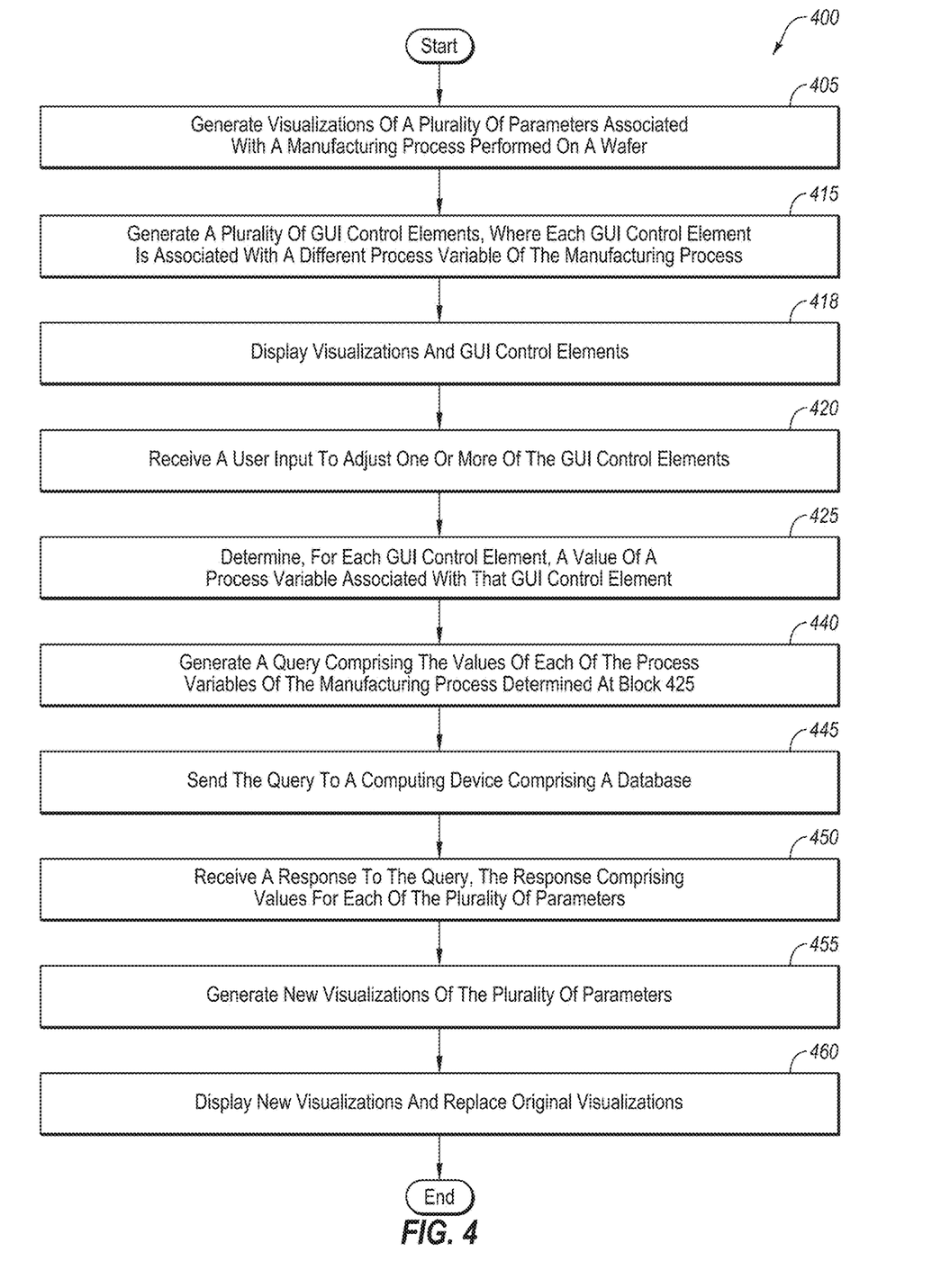
FIG. 4 is a flow diagram illustrating another method for visualizing design of experiments (DOE) results for a manufacturing process on a wafer, in accordance with an embodiment of the present disclosure.

FIG. 4 is a flow diagram illustrating another method 400 for visualizing design of experiments (DOE) results for a manufacturing process on a wafer, in accordance with an embodiment of the present disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic comprises process development visualizer 104 of FIG. 1.

At block 405, processing logic generates visualizations of a plurality of parameters associated with a manufacturing process performed on a wafer. Each of the visualizations show a sets of parameter values for a particular parameter associated with that visualization. The manufacturing process may be, for example, an etch process, a deposition process, a photolithography process, a clean process, an implant process, and so on.

At block 415, processing logic generates and provides a plurality of GUI control elements. Each of the GUI control elements is associated with a different processing variable of the manufacturing process. The GUI control elements and the visualizations may output to windows and/or screens by processing logic, and may be displayed or shown on these windows and/or screens at block 418.

At block 420, processing logic receives a user input to adjust one or more of the GUI control elements. At block 425, processing logic determines, for each GUI control element, a value of a process variable associated with that GUI control element.

At block 440, processing logic generates a query comprising the values of each of the process variables of the manufacturing process that were determined at block 425. At block 445, processing logic sends the query to a computing device comprising a database. At block 450, processing logic receives a response to the query. The response includes values for each of the plurality of parameters associated with the visualizations. At block 455, processing logic then generates new visualizations of the plurality of parameters using the parameter values received at block 450. At block 460, processing logic displays the new visualizations, replacing the original visualizations of the parameters. The new visualizations may be output as an overlay over the original visualizations. If the user adjusts the GUI control elements back to previous settings, then the original visualizations may then be displayed, replacing the new visualizations. Accordingly, a user change one variable for one visualization, and this may change that variable for some or all of the other visualizations as well, causing them to adjust to show different parameter values associated with the changed variable.

Figure 5:
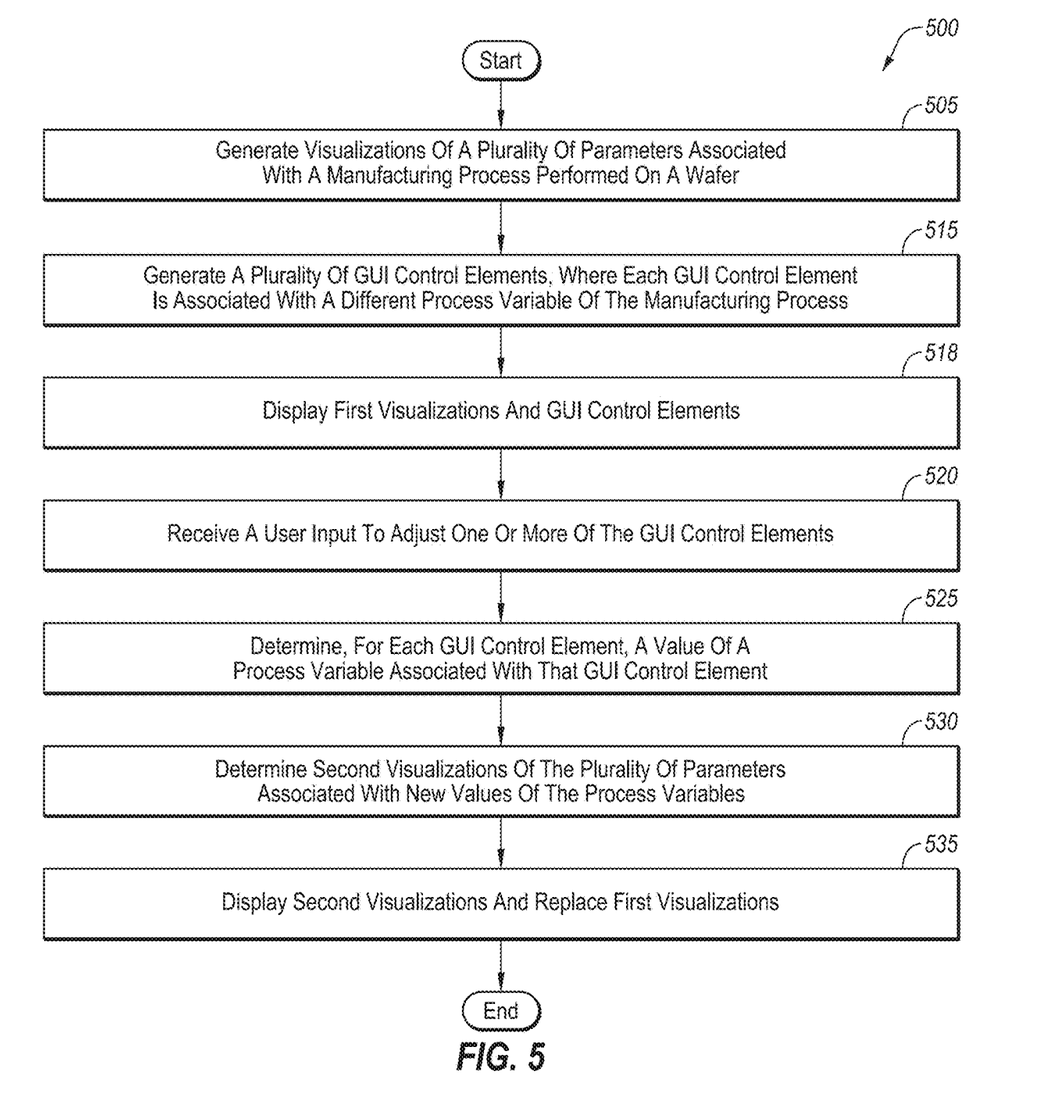
FIG. 5 is a flow diagram illustrating another method for visualizing design of experiments (DOE) results for a manufacturing process on a wafer, in accordance with an embodiment of the present disclosure.

FIG. 5 is a flow diagram illustrating another method 500 for visualizing design of experiments (DOE) results for a manufacturing process on a wafer, in accordance with an embodiment of the present disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic comprises process development visualizer 104 of FIG. 1.

At block 505, processing logic generates visualizations of a plurality of parameters associated with a manufacturing process performed on a wafer. Each of the visualizations show a set of parameter values for a particular parameter associated with that visualization based on a particular combination of process variable values. A different visualization of a parameter may be generated for each combination of process variable values. Accordingly, many different visualizations may be generated. The manufacturing process may be, for example, an etch process, a deposition process, a photolithography process, a clean process, an implant process, and so on.

At block 515, processing logic generates and provides a plurality of GUI control elements. Each of the GUI control elements is associated with a different processing variable of the manufacturing process.

At block 518, current settings for the GUI control elements are determined, and values associated with those current settings are determined. Processing logic then determines visualizations of the parameters that are associated with the determined process variable values. The determined visualizations and the GUI control elements with the determined settings may then be output to windows and/or screens by processing logic, and may be displayed or shown on these windows and/or screens.

At block 520, processing logic receives a user input to adjust one or more of the GUI control elements. At block 525, processing logic determines, for each GUI control element, a value of a process variable associated with that GUI control element.

At block 530, processing logic determines second visualizations for each of the parameters, where the second visualizations are associated with the new values of the process variables. The second visualizations have new parameter values that are based on the new process variable values determined at block 525. At block 535, processing logic displays the second visualizations, overlaying them over the first visualizations.

Figure 6:
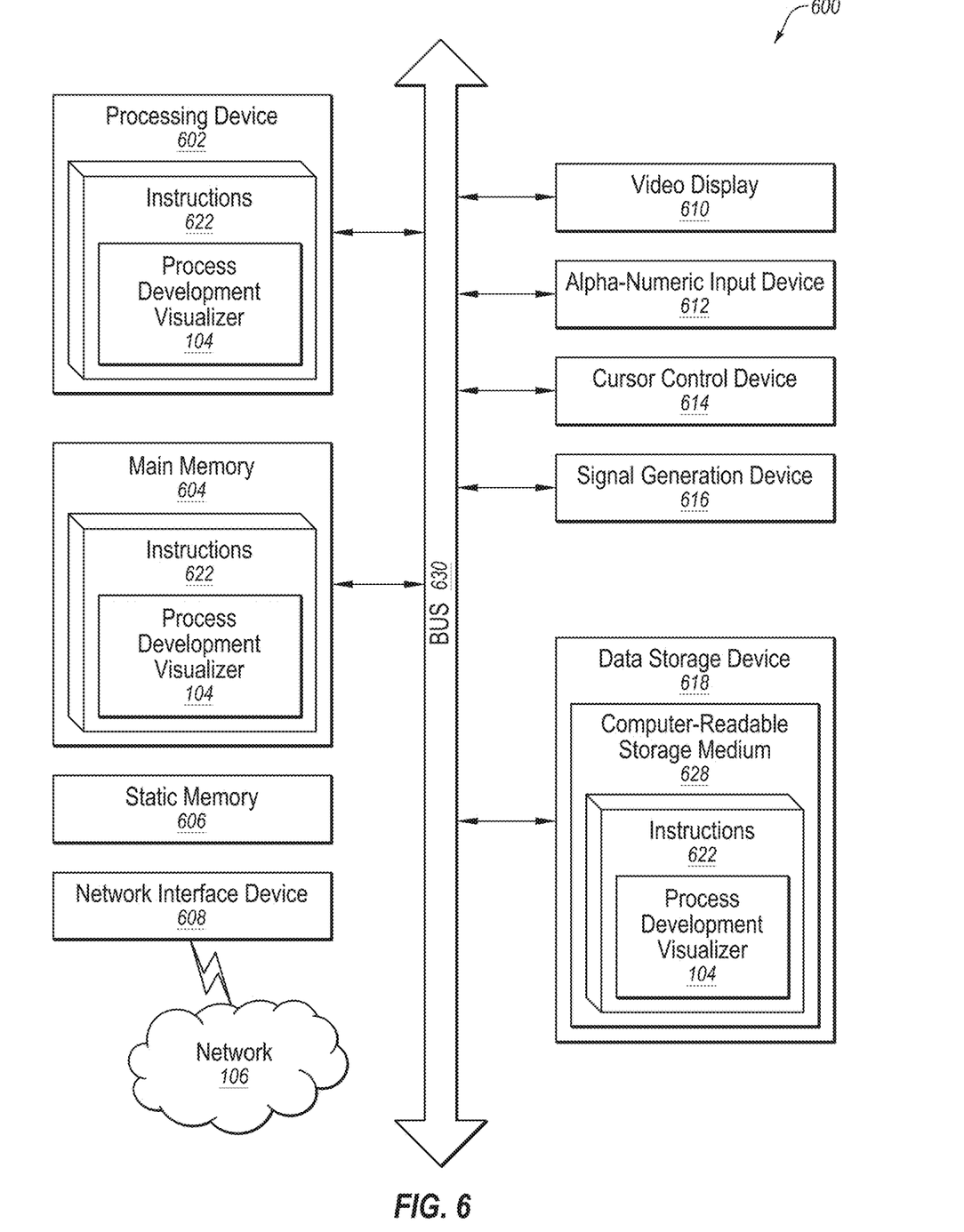
FIG. 6 is a block diagram of an example computer system that may perform one or more of the operations described herein.

FIG. 6 illustrates a diagram of a machine in the example form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 622 for performing the operations and methods discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 on which is stored one or more sets of instructions 622 (e.g., software) embodying any one or more of the methodologies or functions described herein, including process development visualizer 104. The instructions 622 may also reside, completely or at least partially, within the main memory 604 and/or within the processor 602 during execution thereof by the computer system 600, the main memory 604 and the processor 602 also constituting computer-readable storage media.

While the computer-readable storage medium 628 (machine-readable storage medium) is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "calculating", "providing", "sending," "storing," "generating," "modifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the disclosure should be determined with reference to the appended claims, along with the full scope of equivalents to which such claims are entitled.

What is claimed is:

1. A method, comprising:
    generating a first visualization of a first parameter associated with a manufacturing process performed on a wafer, wherein values for the first parameter are dependent on a plurality of process variables of the manufacturing process, and wherein the first visualization represents a first set of values for the first parameter that are associated with a first value for a first process variable of the manufacturing process;
    generating a first visualization of a second parameter associated with the manufacturing process, wherein values for the second parameter are dependent on the plurality of process variables of the manufacturing process, and wherein the first visualization of the second parameter represents a first set of values for the second parameter that are associated with the first value for the first process variable of the manufacturing process;
    outputting the first visualization of the first parameter in a first window;
    concurrently outputting the first visualization of the second parameter in a second window;
    providing a first graphical user interface control element associated with the first process variable of the manufacturing process, wherein the first graphical user interface control element has a first setting associated with the first value for the first process variable;
    receiving a user input to adjust the first graphical user interface control element from the first setting to a second setting;
    determining a second value for the first process variable based on the second setting of the first graphical user interface control element;
    determining a second set of values for the first parameter that are associated with the second value for the first process variable of the manufacturing process;
    determining a second set of values for the second parameter that are associated with the second value for the first process variable of the manufacturing process;
    generating a second visualization of the first parameter associated with the manufacturing process, wherein the second visualization represents the second set of values for the first parameter that are associated with the second value for the first process variable;
    generating a second visualization of the second parameter associated with the manufacturing process, wherein the second visualization represents the second set of values for the second parameter that are associated with the second value for the first process variable;
    outputting the second visualization of the first parameter in the first window; and
    concurrently outputting the second visualization of the second parameter in the second window.

2. The method of claim 1, further comprising:
    receiving an export command via user interaction with a second graphical user interface control element;
    generating a first file comprising a) the second set of values for the first parameter and b) process variable values of the plurality of process variables associated with the second set of values for the first parameter, the process variable values comprising the second value for the first process variable; and
    generating a second file comprising a) the second set of values for the second parameter and b) the process variable values of the plurality of process variables associated with the second set of values for the second parameter.

3. The method of claim 1, wherein the first graphical user interface control element comprises a slider, and wherein each position of the slider is associated with a different value of the first process variable.

4. The method of claim 1, wherein determining the second set of values for the first parameter that are associated with the second value for the first process variable of the manufacturing process comprises:
    generating a query comprising the second value for the first process variable;
    sending the query to a remote computing device; and
    receiving a response to the query, the response comprising the second set of values for the first parameter.

5. The method of claim 1, wherein the first set of values for the first parameter that are represented in the first visualization of the first parameter are further associated with a first value for a second process variable of the manufacturing process, the method further comprising:
    providing a second graphical user interface control element associated with the second process variable of the manufacturing process, wherein the second graphical user interface control element has a first setting associated with the first value for the first second process variable;
    receiving a user input to adjust the second graphical user interface control element from the first setting of the second graphical user interface control element to a second setting of the second graphical user interface control element;

determining a second value for the second process variable based on the second setting of the second graphical user interface control element;

determining a third set of values for the first parameter that are associated with the second value for the first process variable of the manufacturing process and the second value for the second process variable of the manufacturing process; and generating a third visualization of the first parameter associated with the manufacturing process, wherein the third visualization of the first parameter represents the third set of values for the first parameter that are associated with the second value for the first process variable and the second value for the second process variable.

6. The method of claim 1, wherein the first parameter comprises a metrology measurement selected from the group consisting of coating thickness, refractive index, sheet resistance, resistivity, conductivity, grain size, roughness, stress across the wafer, coating composition, reflectance, absorbance, angle of observation, angle of incidence, angle of reflection, angle of diffraction, density, etch rate, and step coverage.

7. The method of claim 1, wherein the first process variable is selected from a group consisting of temperature, chamber pressure, gas flow rate for one or more gasses, one or more device dimensions, process timing, and location within a chamber.

8. The method of claim 1, wherein the first visualization of the first parameter comprises a first wafer map of the wafer, and the second visualization of the first parameter comprises a second wafer map of the wafer.

9. The method of claim 1, wherein determining the second set of values for the first parameter that are associated with the second value for the first process variable of the manufacturing process comprises:

determining that no real data was generated for the first second value for the first process variable of the manufacturing process; and interpolating the second set of values based on additional values for the first parameter that are associated with additional values for the first process variable, wherein the second visualization of the first parameter comprises an indicator that the second visualization of the first parameter was not generated using real data.

10. The method of claim 1, wherein the first parameter comprises a sensor reading of a virtual sensor.

11. The method of claim 1, further comprising:
displaying the first window and the second window in an augmented reality (AR) display.

12. The method of claim 1, further comprising:
generating a function for a virtual sensor, wherein values of the virtual sensor are based on values of one or more physical sensors, and wherein the first process variable is associated with the values of the virtual sensor.

13. A system comprising:
a data store to store process development data for a manufacturing process performed on a wafer; and
a computing device comprising:
a memory comprising instructions for a process development visualization tool; and
a processing device operatively connected to the memory, wherein execution of the instructions for the process development visualization tool causes the processing device to:

generate a first visualization of a first parameter associated with the manufacturing process, wherein values for the first parameter are dependent on a plurality of process variables of the manufacturing process, and wherein the first visualization of the first parameter represents a first set of values for the first parameter that are associated with a first value for a first process variable of the manufacturing process;

generate a first visualization of a second parameter associated with the manufacturing process, wherein values for the second parameter are dependent on the plurality of process variables of the manufacturing process, and wherein the first visualization of the second parameter represents a first set of values for the second parameter that are associated with the first value for the first process variable of the manufacturing process;

output the first visualization of the first parameter in a first window;

concurrently output the first visualization of the second parameter in a second window;

provide a first graphical user interface control element associated with the first process variable of the manufacturing process, wherein the first graphical user interface control element has a first setting associated with the first value for the first process variable;

receive a user input to adjust the first graphical user interface control element from the first setting to a second setting;

determine a second value for the first process variable based on the second setting of the first graphical user interface control element;

determine a second set of values for the first parameter that are associated with the second value for the first process variable of the manufacturing process;

determine a second set of values for the second parameter that are associated with the second value for the first process variable of the manufacturing process;

generate a second visualization of the first parameter associated with the manufacturing process, wherein the second visualization of the first parameter represents the second set of values for the first parameter that are associated with the second value for the first process variable;

generate a second visualization of the second parameter associated with the manufacturing process, wherein the second visualization represents the second set of values for the second parameter that are associated with the second value for the first process variable;

output the second visualization of the first parameter in the first window; and concurrently output the second visualization of the second parameter in the second window.

14. The system of claim 13, wherein the first set of values for the first parameter that are represented in the first visualization of the first parameter are further associated with a first value for a second process variable of the manufacturing process, and wherein the processing device is further to:
  provide a second graphical user interface control element associated with the second process variable of the manufacturing process, wherein the second graphical user interface control element has a first setting associated with the first value for the first second process variable;
  receive a user input to adjust the second graphical user interface control element from the first setting of the second graphical user interface control element to a second setting of the second graphical user interface control element;
  determine a second value for the second process variable based on the second setting of the second graphical user interface control element;
  determine a third set of values for the first parameter that are associated with the second value for the first process variable of the manufacturing process and the second value for the second process variable of the manufacturing process; and
  generate a third visualization of the first parameter associated with the manufacturing process, wherein the third visualization of the first parameter represents the third set of values for the first parameter that are associated with the second value for the first process variable and the second value for the second process variable.

15. The system of claim 13, wherein the first visualization of the first parameter comprises a first wafer map of the wafer, wherein the second visualization of the first parameter comprises a second wafer map of the wafer, wherein the first graphical user interface control element comprises a slider, and wherein each position of the slider is associated with a different value of the first process variable.

16. The system of claim 13, wherein determining the second set of values for the first parameter that are associated with the second value for the first process variable of the manufacturing process comprises:
  determining that no real data was generated for the second value for the first process variable of the manufacturing process; and
  interpolating the second set of values based on additional values for the first parameter that are associated with additional values for the first process variable, wherein the second visualization of the first parameter comprises an indicator that the second visualization was not generated using real data.

17. The system of claim 13, wherein to determine the second set of values for the first parameter that are associated with the second value for the first process variable of the manufacturing process the computing device is further to:
  generate a query comprising the second value for the first process variable;
  send the query to the data store; and
  receive a response to the query, the response comprising the second set of values for the first parameter.

18. A non-transitory machine-readable storage medium including instructions that, when executed by a processing device, cause the processing device to perform operations comprising:
  generating a first visualization of a first parameter associated with a manufacturing process performed on a wafer, wherein values for the first parameter are dependent on a plurality of process variables of the manufacturing process, and wherein the first visualization represents a first set of values for the first parameter that are associated with a first value for a first process variable of the manufacturing process;
  generating a first visualization of a second parameter associated with the manufacturing process performed on a wafer, wherein values for the second parameter are dependent on the plurality of process variables of the manufacturing process, and wherein the first visualization of the second parameter represents a first set of values for the second parameter that are associated with the first value for the first process variable of the manufacturing process;
  outputting the first visualization of the first parameter in a first window;
  concurrently outputting the first visualization of the second parameter in a second window;
  providing a first graphical user interface control element associated with the first process variable of the manufacturing process, wherein the first graphical user interface control element has a first setting associated with the first value for the first process variable;
  receiving a user input to adjust the first graphical user interface control element from the first setting to a second setting;
  determining a second value for the first process variable based on the second setting of the first graphical user interface control element;
  determining a second set of values for the first parameter that are associated with the second value for the first process variable of the manufacturing process;
  determining a second set of values for the second parameter that are associated with the second value for the first process variable of the manufacturing process;
  generating a second visualization of the first parameter associated with the manufacturing process, wherein the second visualization represents the second set of values for the first parameter that are associated with the second value for the first process variable;
  generating a second visualization of the second parameter associated with the manufacturing process, wherein the second visualization represents the second set of values for the second parameter that are associated with the second value for the first process variable;
  outputting the second visualization of the first parameter in the first window; and
  concurrently outputting the second visualization of the second parameter in the second window.

19. The non-transitory machine-readable storage medium of claim 18, wherein the first set of values for the first parameter that are represented in the first visualization of the first parameter are further associated with a first value for a second process variable of the manufacturing process, the operations further comprising:
  providing a second graphical user interface control element associated with the second process variable of the manufacturing process, wherein the second graphical user interface control element has a first setting associated with the first value for the first second process variable;
  receiving a user input to adjust the second graphical user interface control element from the first setting of the second graphical user interface control element to a second setting of the second graphical user interface control element;

determining a second value for the second process variable based on the second setting of the second graphical user interface control element;

determining a third set of values for the first parameter that are associated with the second value for the first process variable of the manufacturing process and the second value for the second process variable of the manufacturing process; and generating a third visualization of the first parameter associated with the manufacturing process, wherein the third visualization of the first parameter represents the third set of values for the first parameter that are associated with the second value for the first process variable and the second value for the second process variable.

20. The non-transitory machine-readable storage medium of claim 18, wherein determining the second set of values for the first parameter that are associated with the second value for the first process variable of the manufacturing process comprises:

determining that no real data was generated for the first second value for the first process variable of the manufacturing process; and interpolating the second set of values based on additional values for the first parameter that are associated with additional values for the first process variable, wherein the second visualization of the first parameter comprises an indicator that the second visualization of the first parameter was not generated using real data.

\* \* \* \* \*